United States Patent [19]

Toft

[11] Patent Number: 5,751,694
[45] Date of Patent: May 12, 1998

[54] METHODS AND APPARATUS FOR SYNCHRONIZING TEMPORALLY RELATED DATA STREAMS

[75] Inventor: Rolf Toft, La Jolla, Calif.

[73] Assignees: Sony Corporation, Tokyo, Japan; Sony Electronics Inc., N.J.

[21] Appl. No.: 445,854

[22] Filed: May 22, 1995

[51] Int. Cl.$^6$ .................... H04J 3/04; H04J 3/06
[52] U.S. Cl. .................... 370/109; 348/15; 348/17
[58] Field of Search .................... 370/77, 78, 84, 370/100.1, 105.1, 108, 109, 112; 379/201, 202; 455/3.1; 375/355, 356; 348/6, 15, 17, 423

[56] References Cited

U.S. PATENT DOCUMENTS

| | | | |
|---|---|---|---|
| 4,887,158 | 12/1989 | Guichard et al. | 358/143 |
| 5,050,167 | 9/1991 | Izadpanah | 370/108 |
| 5,157,491 | 10/1992 | Kassatly | 379/202 |
| 5,451,942 | 9/1995 | Beard et al. | 341/50 |
| 5,467,137 | 11/1995 | Zdepski | 348/423 |
| 5,506,844 | 4/1996 | Rao | 370/84 |
| 5,508,733 | 4/1996 | Kassatly | 248/13 |
| 5,526,360 | 6/1996 | Kraft | 370/108 |

FOREIGN PATENT DOCUMENTS

| | | | |
|---|---|---|---|
| 0648056 A2 | 4/1995 | European Pat. Off. | H04N 7/24 |
| 2210231 | 6/1989 | United Kingdom | H04N 5/04 |
| 2273215 | 6/1994 | United Kingdom | H04N 5/04 |

OTHER PUBLICATIONS

International Telecommunication Union—ITU-T Telecommunication Standardization Sector of ITU H.261 (Mar. 1993) "Line Transmission of Non-Telephone Signals" Video Codec for Audiovisual Services at p×64 kbits—ITU-T Recommendation H.261 (Previously CCITT Recommendation).

International Telecommunication Union—ITU-T Telecommunication Standardization Sector of ITU—H.2221 (Mar. 1993) "Line Transmission of Non-Telephone Signals" Frame Structure for a 64 to 1920 kbit/s Channel in Audio Visual Teleservices—ITU-T Recommendation H.221 (Previously CCITT Recommendation).

*Primary Examiner*—Benedict V. Safourek
*Assistant Examiner*—Ricky Q. Ngo
*Attorney, Agent, or Firm*—Limbach & Limbach L.L.P.

[57] ABSTRACT

A method and apparatus for dynamically synchronizing a plurality of streams of temporally related data generate compression time information regarding the time required to compression a first stream of data. The compression time information is transmitted together with the first and other compressed streams of data, and is utilized to delay at least one decompressed compressed stream of data to thereby synchronize such decompressed stream with a decompressed compressed first stream of data. The decompression time information is determined by selecting, from a look-up table, a delay time corresponding to the compression time information.

38 Claims, 5 Drawing Sheets

BIT NUMBER

```
  1    2    3    4    5    6    7    8         OCTET NUMBER
┌────┬────┬────┬────┬────┬────┬────┬────┐  1
│    │    │    │    │    │    │    │ FAS│  .
│ S  │ S  │ S  │ S  │ S  │ S  │ S  │    │  8
│ U  │ U  │ U  │ U  │ U  │ U  │ U  ├────┤  9
│ B  │ B  │ B  │ B  │ B  │ B  │ B  │ BAS│  .
│ -  │ -  │ -  │ -  │ -  │ -  │ -  │    │  16
│ C  │ C  │ C  │ C  │ C  │ C  │ C  ├────┤  17
│ H  │ H  │ H  │ H  │ H  │ H  │ H  │    │  .
│ A  │ A  │ A  │ A  │ A  │ A  │ A  │    │
│ N  │ N  │ N  │ N  │ N  │ N  │ N  │    │
│ N  │ N  │ N  │ N  │ N  │ N  │ N  │ AC │
│ E  │ E  │ E  │ E  │ E  │ E  │ E  │    │
│ L  │ L  │ L  │ L  │ L  │ L  │ L  │    │
│    │    │    │    │    │    │    │    │
│ #  │ #  │ #  │ #  │ #  │ #  │ #  │    │  .
│ 1  │ 2  │ 3  │ 4  │ 5  │ 6  │ 7  │    │  80
└────┴────┴────┴────┴────┴────┴────┴────┘
```

FAS  FRAME ALIGNMENT SIGNAL (NOTE)
BAS  BIT-RATE ALLOCATION SIGNAL
AC   APPLICATION CHANNEL

NOTE — THE BLOCK TERMED AS FAS ALSO CONTAINS INFORMATION OTHER THAN THAT USED FOR FRAME ALIGNMENT.

FIG. 4

STRUCTURE OF
PICTURE LAYER
H.261.

METHODS AND APPARATUS FOR SYNCHRONIZING TEMPORALLY RELATED DATA STREAMS

BACKGROUND OF THE INVENTION

1. Field of the Invention

The present invention relates generally to the synchronization of data streams, and in particular to methods and apparatus for synchronizing a plurality of temporally related compressed data streams which are transmitted together over a transmission medium.

2. Description of the Related Art

The transmission of related compressed data streams over a transmission medium typically occurs in video teleconferencing systems. Since audio is handled by a different algorithm, processing time for compressing/decompressing an audio bit stream corresponding to a given time period sample will be different than the time required to compress/decompress the video bitstream corresponding to the same time period image.

Figure 1:
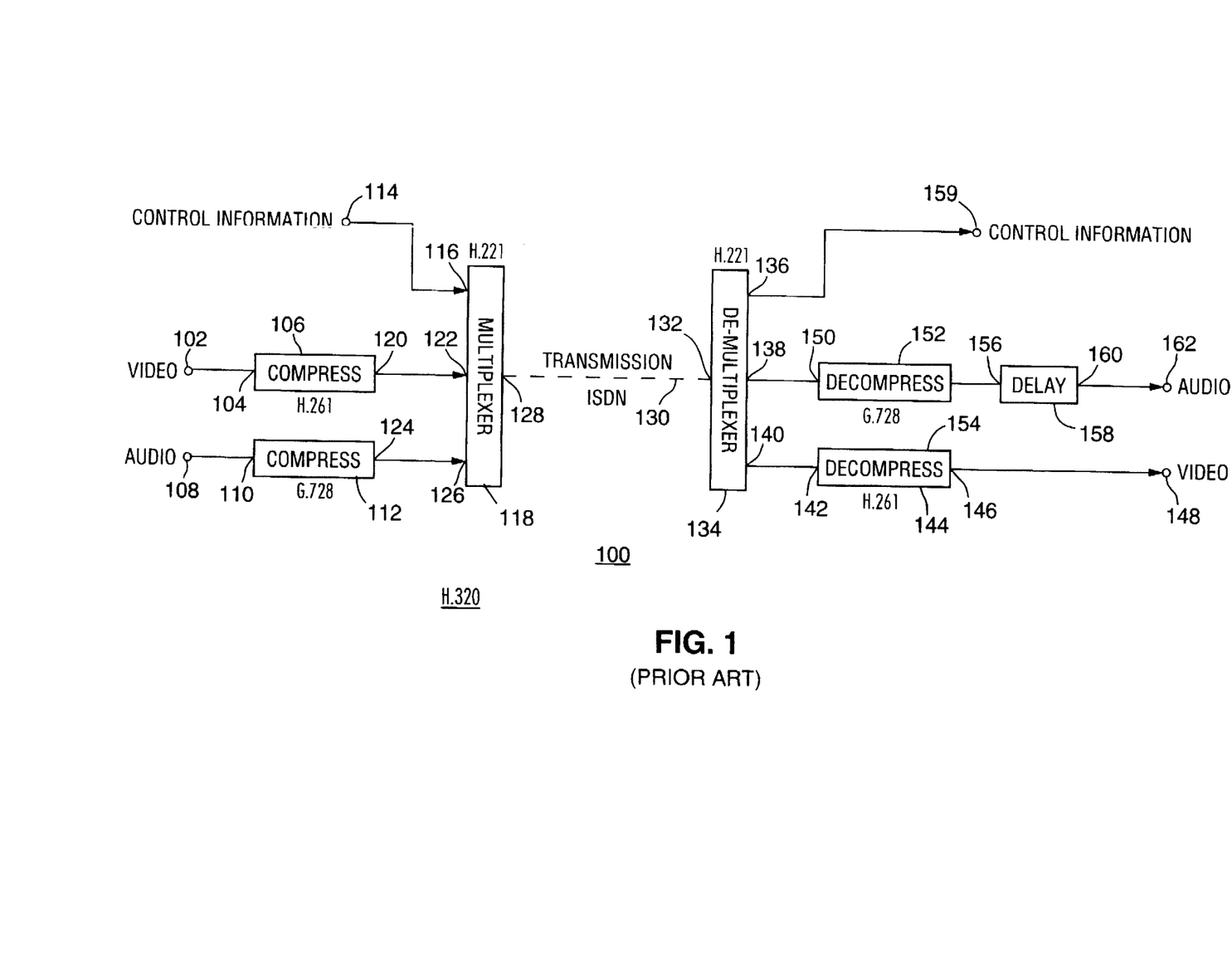
FIG. 1 is a block diagram of a conventional system for data stream compression and decompression as used for teleconferencing.
Figure 2:
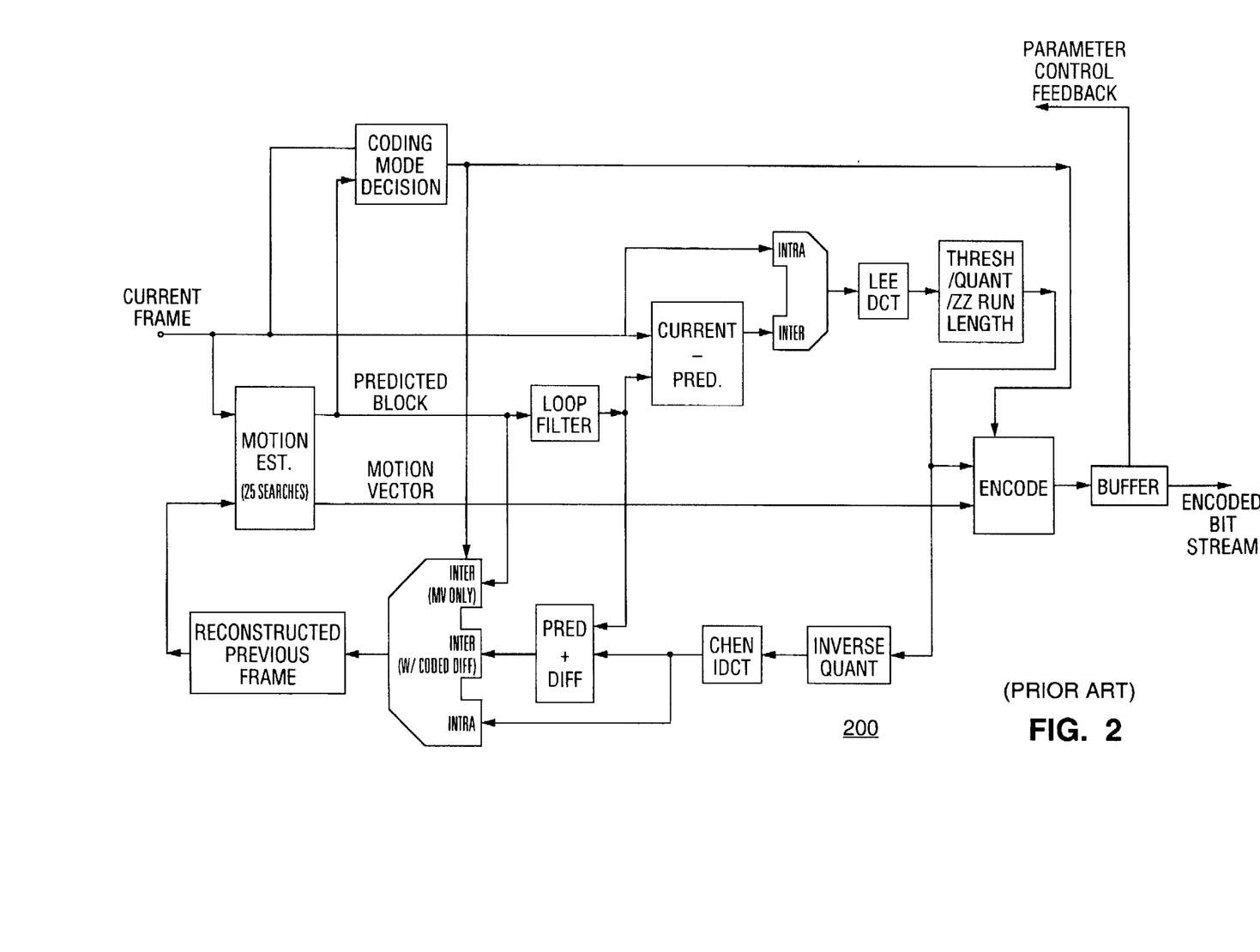
FIG. 2 is a block diagram of a video encoding system according to the CCITT H.261 standard.

With reference to FIG. 1, a block diagram of a conventional CCITT H.320 teleconferencing system 100 is illustrated. A video signal, for example, from a television camera within a conference room, is provided to a video input 102. The video input 102 is coupled to an input 104 of a compressor 106. The compressor 106 may compress the video signal using any of a number of algorithms, such as for example, an algorithm according to the CCITT H.261 standard. According to the H.261 standard, a video frame is encoded based upon motion estimation derived from a reconstructed previous frame, followed by threshold determination, quantization and run length encoding. Such a system is illustrated by the system 200 of FIG. 2.

Figure 3:
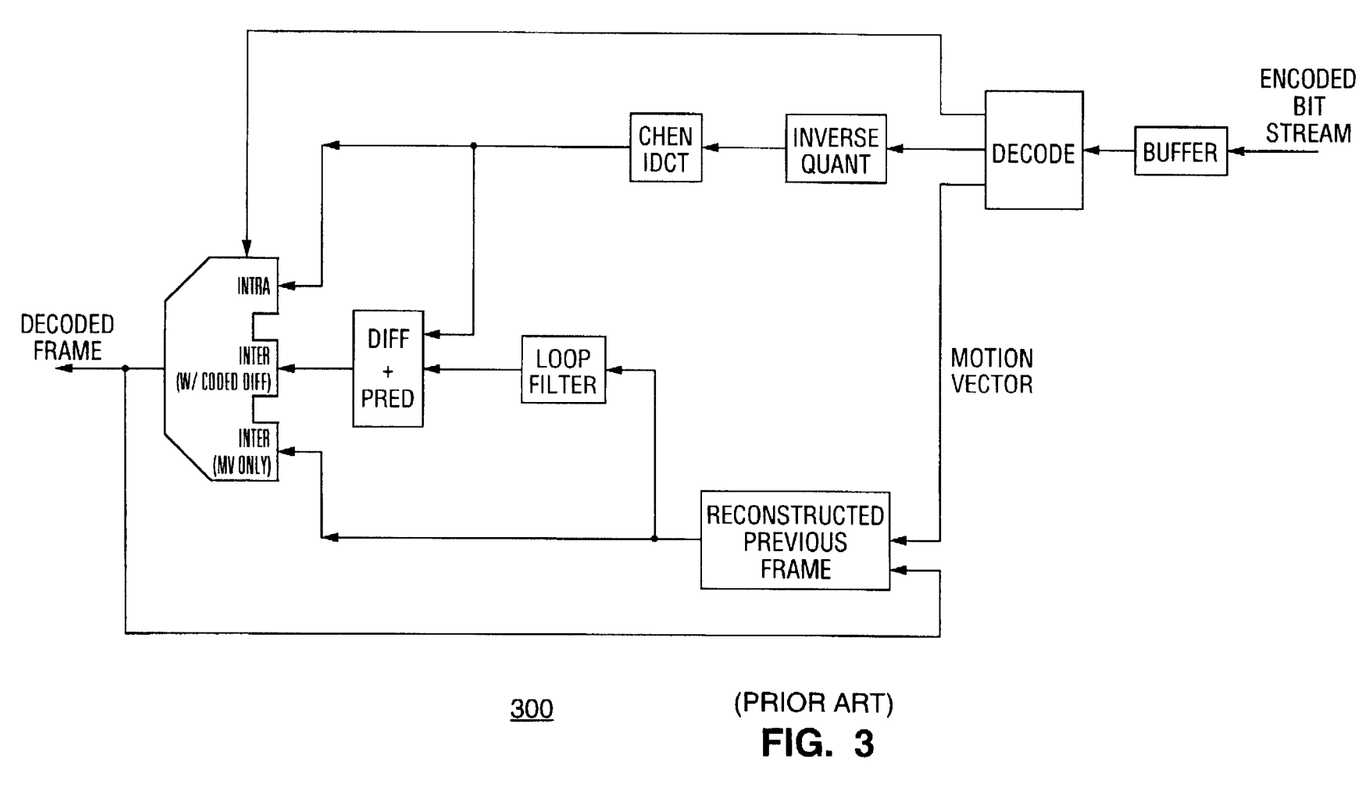
FIG. 3 is a block diagram of a video decoding system according to the CCITT H.261 standard.

An encoded frame is decoded in an essentially inverse manner as illustrated by the system 300 of FIG. 3.

Alternatively, the video signal may be compressed using differential coding based upon motion vectors of each pixel within a frame.

Referring again to FIG. 1, a corresponding audio signal, for example, generated by a microphone within the same conference room, is provided to an audio input 108. The audio signal is thereby provided to an input 110 of a compressor 112. Compressor 112 may, for example, operate according to the CCITT G.728 standard, which standard utilizes a 16 kbit/sec low-delay code-excited linear prediction speed coder. Since the bandwidth of the audio signal is significantly less than the bandwidth of the video signal, a less complicated compression algorithm requiring less processing time is required in order to achieve an acceptable bandwidth.

Control information which is input to a control information input 114 is provided to a first multiplexer input 116. The control information typically consists of data which directs the multiplexer 118 to multiplex or assemble a plurality of data streams according to a preselected pattern or protocol. A compressed video signal from the compressor 106 is provided from a compressor output 120 to a second multiplexer input 122. A compressed audio signal from the compressor 112 is provided from a compressor output 124 to a third multiplexer input 126.

The multiplexer 118 time division multiplexes, in accordance with the CCITT H.221 standard, the control information with the compressed video signal and the compressed audio signal and provides a multiplexed signal to an output 128. According to the CCITT H.221 standard, a 64 kbit/ second channel is structured into octets transmitted at 8 kHz. The eighth bit of each octet conveys a subchannel of 8 kbit/second. This subchannel, which is typically referred to as a service channel ("SC"), provides end-to-end signalling and consists of three parts.

Figure 4:
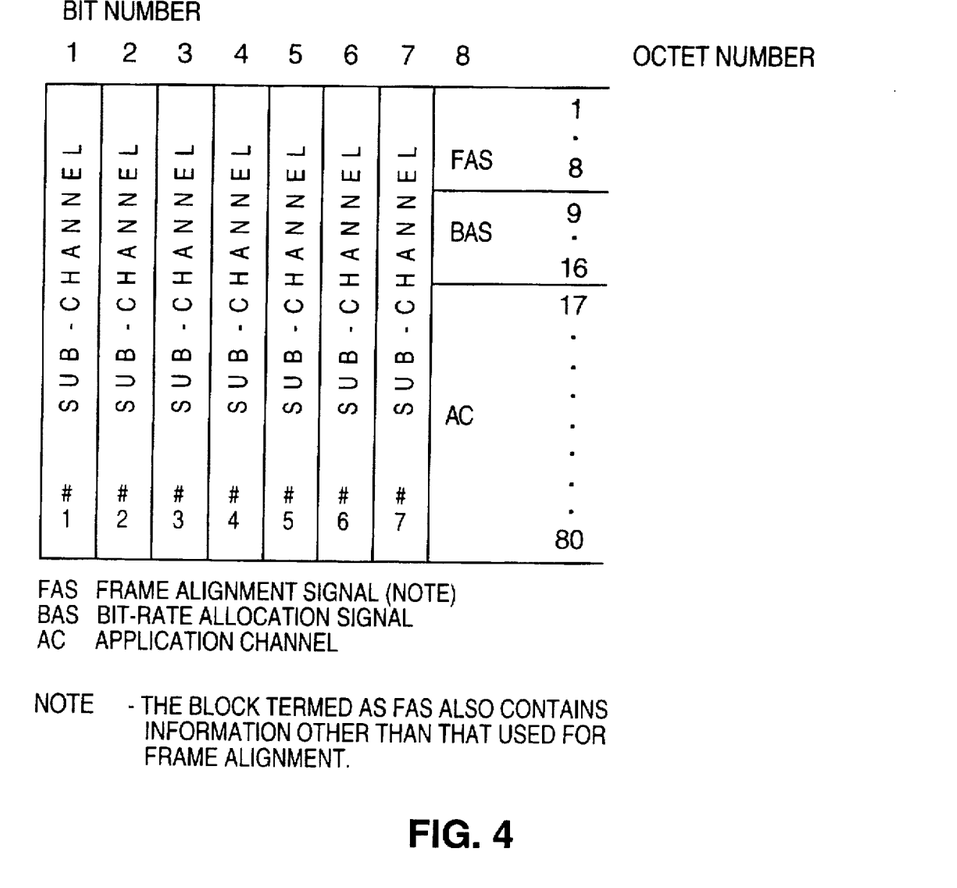
FIG. 4 is a table showing a frame structure of a service channel according to the CCITT H.221 standard.

With reference to FIG. 4, the service channel consists of a first part known as a frame alignment signal ("FAS"), a bit-rate allocation signal ("BAS") and an application channel ("AC").

The frame alignment signal structures the 64 kbit/second channel into frames of 80 octets each and multiframes of 16 fames each. Each multiframe is divided into eight 2-frame submultiframes. In addition to framing and multiframing information, control and alarm information may be inserted, as well as error check information to control end-to-end error performance and to check frame alignment validity. The frame alignment signal may also be utilized to derive octet timing which it is not provided by a transmission network.

The bit-rate allocation signal allows the transmission of codewords to describe the capability of a terminal to structure the residual 62.4 kbit/sec capacity in various ways, and to command a receiver to demultiplex and make use of the constituent signals in such structures. If other 64 kbit/second channels are associated, as in the case of n×64 kbit/second services, this association may also be defined.

The application channel ("AC") allows transmission of binary information of the insertion of message type data channel(s), e.g., for telematic information) up to 6400 bit/ second. A minimum required command and indication channel should be provided and defined as part of the application channel. The remaining bit rate for the application channel may be added to the sound data or video data.

With reference again to FIG. 1, the output 128 of multiplexer 118 provides the multiplexed signal to an a transmission medium 130, such as an integrated services digital network ("ISDN"), which is offered by local telephone operating companies such as Pacific Bell and by long distance carriers such as AT&T, MCI and Sprint.

The transmission medium 130 provides the multiplexed signal to an input 130 of a demultiplexer 134. Demultiplexer 134 time division demultiplexes the multiplexed signal according to the CCITT H.221 standard and provides control information to a first output 136 of the demultiplexer 134, a compressed audio signal to a second output 138 of the demultiplexer 134,and a compressed video signal to a third output 140 of the demultiplexer 142.

The compressed video signal from the third output 140 is provided to an input 142 of a decompressor 144. Decompressor 144 decompresses the compressed video signal in accordance with the CCITT H.261 standard, provides the reconstructed (compressed and decompressed) video signal to an output 146 which is coupled to a video output 148. The video signal at output 148 is then displayed on a suitable video monitor (not shown).

The compressed audio signal at output 138 is provided to an input 150 of the decompressor 152. Decompressor 152, in accordance with the CCITT H.728 standard, decompresses the compressed audio signal to provide a reconstructed audio signal at an output 154. The audio signal at output 154 is provided to a first input 156 of a delay circuit 158. Control information from output 136 of demultiplexer 134 is provided to an output 159. Delay circuit 158 operates to delay the decompressed audio signal by an amount of time which is either fixed or is varied without relation to frame decompression time. The delay circuit 158 thus operates in an effort to synchronize timing of the audio signal to images which are part of the video signal. The delayed decompressed audio signal is provided at an output 162 of the delay circuit 158. Output 162 is coupled to an audio output 164, which in a teleconferencing system, drives an audio system including either a loudspeaker, headphones, or both.

In further detail, within a teleconference setting, it is extremely desirable to synchronize the facial movements of a participant with the sounds spoken by that participant. Otherwise, it appears to viewers at the other end of the transmission line 132 that the audio has been dubbed.

With the conventional CCITT H.320 system, the use of a fixed delay or a variable delay which has no relation to the amount of motion within video signals is simply an accepted compromise in return for the use of compression to lower transmission bandwidth requirements, while maintaining an acceptable level of image resolution.

Furthermore, in a teleconference system where a plurality of video signals are provided together with a related audio signal, as in for example, a real-time windowed image system for use in remotely teaching surgical techniques, it may be desirable to utilize a different compression algorithm with each separate video signal, since the resolution and image refresh requirements would be optimized for each video signal. Notwithstanding such differences in the processing of such video signals, it is still extremely desirable that the motion shown within each image be synchronized between the images and as between the related audio signal.

Accordingly, it would be desirable to provide methods and apparatus for dynamically synchronizing a plurality of related compressed data streams which are transmitted together over a transmission medium to thereby provide a more viewable and realistic audio-visual presentation or teleconference.

SUMMARY OF THE INVENTION

It is an object of the invention to provide a method and apparatus for dynamically synchronizing a plurality of related compressed data streams which are transmitted together over a transmission medium.

It is a further object of the invention to provide a method and apparatus for efficiently incorporating synchronization data within control information which is multiplexed with the plurality of related compressed data streams.

It is an additional object of the invention to provide a method and apparatus for dynamically controlling the delay of a second data stream based upon the difference between the total time for the compression and decompression of a first data stream and the total time for the compression and decompression of the second data stream.

It is a feature of the invention to generate data indicative of the time for encoding a first data stream and to include such generated data within control information which is multiplexed together with a plurality of compressed data streams.

It is a further feature of the invention to utilize data indicative of the time for encoding at least one data stream to dynamically control amounts of delay applied to one or more other compressed and decompressed data streams.

It is an additional feature of the invention to utilize the data indicative of the time for encoding a first data stream to generate data indicative of an expected amount of time required for decoding an encoded first data stream.

It is another feature of the invention to dynamically vary an amount of delay applied to a decompressed compressed data stream based upon delay data generated on a frame by frame basis for video signals.

It is an advantage of the invention to provide more accurate synchronization between related compressed data streams than provided by conventional systems.

It is an additional advantage of the invention to provide more accurate synchronization between related compressed data streams than provided by conventional systems without significantly increasing the bandwidth required to transmit such related compressed data streams.

According to one aspect of the invention a system for dynamically synchronizing a plurality of streams of temporally related data utilizes a first compressor to compress a first stream of data to thereby generate a first compressed stream of data and for generating compression time data indicative of a first period of time $t_1$ required to compress the first stream of data, a second compressor to compress, within a second period of time $t_2$, a second stream of data to generate a second compressed stream of data, the second stream of data temporally related to the first stream of data, a transmission medium to transmit the compressed first stream of data, the compressed second stream of data and the compression time data, a first decompressor to decompress, within a third period of time $t_3$, the compressed first stream of data to thereby generate first decompressed signal, a second decompressor to decompress, within a fourth period of time $t_4$, the compressed second stream of data to generate a second decompressed signal, and a delay circuit to delay the second decompressed signal by an amount of time $t_1$ indexed into a number (value) representing $t_3-t_4$.

According to another aspect of the invention a system for dynamically synchronizing a plurality of streams of temporally related data utilizes a first compressor to compress a first stream of data to thereby generate a first compressed stream of data and for generating compression time data indicative of a period of time required to compress the first stream of data, a second compressor to compress, a second stream of data to generate a second compressed stream of data, the second stream of data temporally related to the first stream of data, a transmission medium to transmit the compressed first stream of data, the compressed second stream of data and the compression time data, a first decompressor to decompress, the compressed first stream of data to thereby generate first decompressed signal, a second decompressor to decompress, the compressed second stream of data to generate a second decompressed signal, and a delay circuit to delay the second decompressed signal by an amount of time determined from the compression time data.

According to yet another aspect of the invention a method of dynamically synchronizing a plurality of streams of temporally related data compresses a first stream of data to generate a first compressed stream of data and compression time data indicative of a first period of time $t_1$ required to compress the first stream of data, compresses, within a second period of time $t_2$, a second stream of data to generate a second compressed stream of data, the second stream of data temporally related to the first stream of data, transmits the compressed first stream of data, the compressed second stream of data and the compression time data, decompresses, within a third period of time $t_3$, the compressed first stream of data to generate a first decompressed signal, decompresses, within a fourth period of time $t_4$, the compressed second stream of data to generate a second decompressed signal, and delays the second decompressed signal by an amount of time $t_1$ indexed into a number (value) representing $t_3-t_4$.

According to a further aspect of the invention a method of dynamically synchronizing a plurality of streams of temporally related data compresses a first stream of data to generate a first compressed stream of data and compression time data indicative of a period of time required to compress the first stream of data, compresses, a second stream of data to generate a second compressed stream of data, the second stream of data temporally related to the first stream of data, transmits the compressed first stream of data, the compressed second stream of data and the compression time data, decompresses, the compressed first stream of data to generate a first decompressed signal, decompresses the compressed second stream of data to generate a second decompressed signal, and delays the second decompressed signal by an amount of time determined from the compression time data.

These and other objects, features and advantages will become apparent when considered with reference to the following description and the accompanying drawings.

DETAILED DESCRIPTION OF THE PREFERRED EMBODIMENTS

Figure 5:
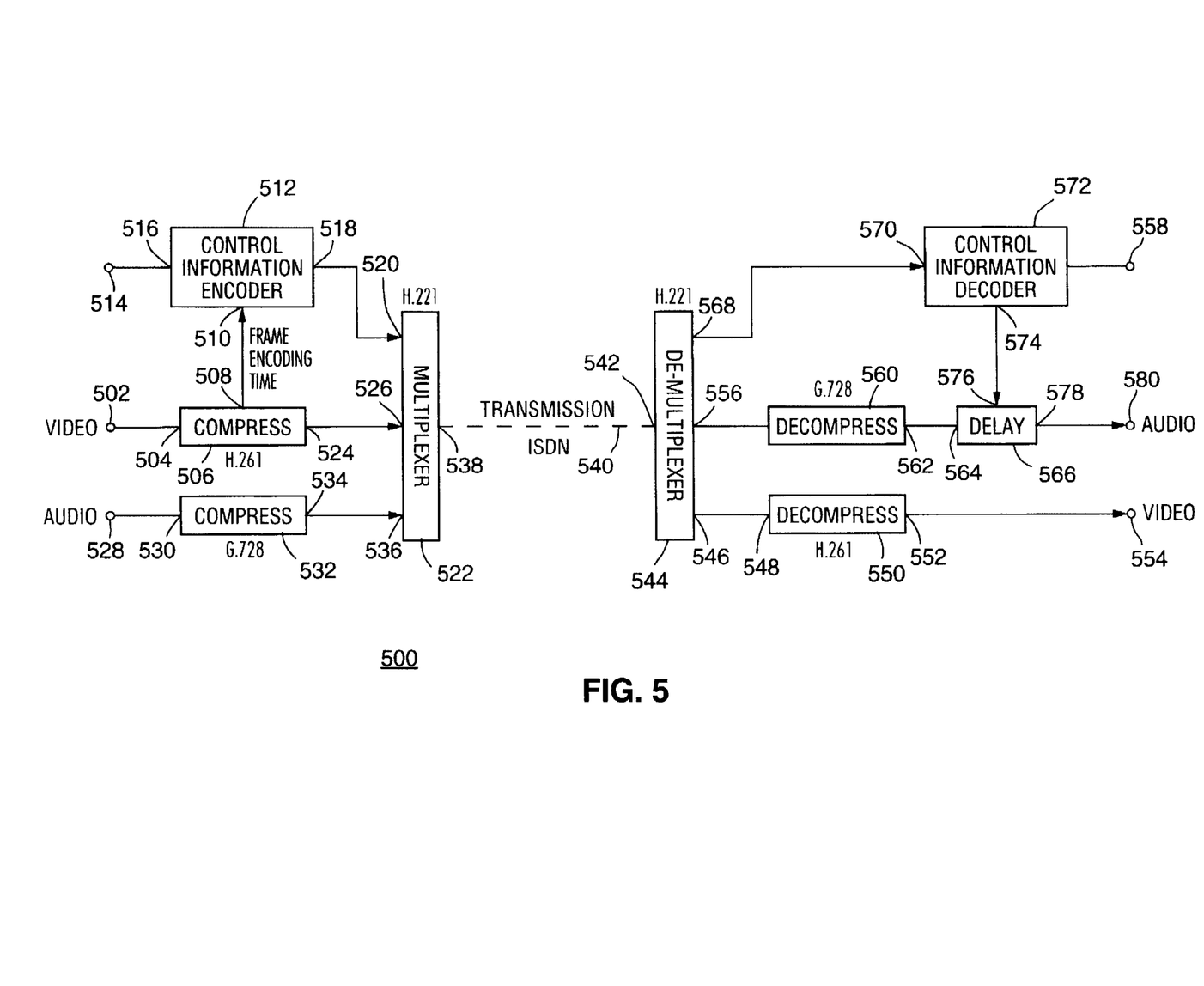
FIG. 5 is a block diagram of a system for data stream compression and decompression in accordance with the present invention.

With reference now to FIG. 5, a system 500 for dynamically synchronizing related data streams in accordance with the invention is shown. The system 500 includes a video input 505 which is couples a video signal to an input 504 of compressor 506. In the preferred embodiment of the invention, compressor 506 utilizes a compression algorithm according the CCITT H.261 standard to thereby generate a compressed video signal which is provided to an output 524 of compressor 508. In contrast to compressor 106 of FIG. 1, compressor 508 includes an output 508 which provides time data which indicates the amount of time required to compress a single frame of video. Such time data, which hereinafter is referred to as "frame encoding time" is provided to an input 510 of a control information encoder 512. The control information encoder combines the frame encoding time together with control information which is provided to a control information input 514 and coupled to an input 516 of control information encoder 512.

An output 518 of control information encoder 512 is coupled to an input 520 of a multiplexer 522. Output 524 of compressor 508 is coupled to an input 526 of multiplexer 522.

An audio signal is provided to an audio signal input 528, and the audio signal is coupled to an input 530 of a compressor 532. A compressed audio signal is provided at an output 534 and coupled to an input 536 of multiplexer 522.

In the preferred embodiment of the invention, multiplexer 522 time division multiplexes the compressed video signal, the compressed audio signal and the encoded control information (including frame encoding time). In the preferred embodiment of the invention, the multiplexer time division multiplexes signals according to the CCITT H.221 standard.

The multiplexed signals are provided to an output 538 of multiplexer 522, which output is coupled to an ISDN 540. The ISDN 540 in turn provides the multiplexed signals to an input 542 of a demultiplexer 544. In the preferred embodiment of the invention, demultiplexer 544 demultiplexes the multiplexed signals in accordance with the CCITT H.221 standard to thereby provide a compressed video signal at an output 546. Output 546 is coupled to an input 548 of a decompressor 550. In the preferred embodiment of the invention, decompressor 550 decompresses video signals in accordance with the CCITT H.261 standard to thereby provide a decompressed video signal at an output 552. The decompressed video signal at output 552 is coupled to a video output 554, which in turn may be coupled to a video monitor (not shown) for display of sequential images.

Demultiplexer 544 also provides a compressed audio signal at an output 556. This compressed audio signal is coupled to an input 558 of a decompressor 560. In the preferred embodiment of the invention, decompressor 560 decompresses compressed audio signals in accordance with the CCITT G.728 standard. Decompressed audio signals are provided at an output 562 of decompressor 560. These audio signals are provided to an input 564 of a delay circuit 566. The delay circuit 566 operates to temporally delay the decompressed audio signals by an amount of time necessary to synchronize the decompressed audio signal with the decompressed video signal.

In further detail, a third output 568 of demultiplexer 544, provides control information which includes data representative of the frame encoding time, that is, the time required, on a frame-by-frame- basis, to compress each frame of video. The control information is provided to an input 570 of a control information decoder 572. Control information decoder 572 extracts data representative of the frame encoding time for each frame of video and then by way of a look-up table, determines the corresponding an amount of delay to be applied to the decompressed audio signal. Generally, because of the mathematical calculations required for each operation, the frame encoding time is longer than the frame decoding time.

Since the time required for compressor 532 to compress an audio signal is relatively constant, and since the time required for decompressor 560 to decompress a compressed audio signal is relatively constant (given the predictability of human speech), the total time required for compressing and decompressing an audio signal can be reasonably predicted to be constant. Thus, the look-up table can simply incorporate, for each specific delay time corresponding to a frame encoding time, a constant value representative of the amount of time to compress and subsequently decompress an audio signal.

Therefore, the control information decoder determines from the video frame encoding time the total amount of delay necessary to synchronize the decompressed audio signal with each frame represented by the decompressed video signal. Data indicative of this total amount of delay is provided to an output 574 of control information decoder 572. This data is then coupled to an input 576 of delay circuit 566 to thereby control the amount of delay applied to the decompressed audio signal. The control information decoder also provides control information to an output 582. Such control information may be utilized to control video display devices (not shown).

The delayed decompressed audio signal is provided to an output 578 of delay circuit 566, and output 578 is coupled to an audio signal output 580. The synchronized audio signal at audio signal output 580 is typically coupled to an audio amplifier which drives electromechanical and/or piezoelectric transducers such as loudspeakers or headphones.

Figure 6:
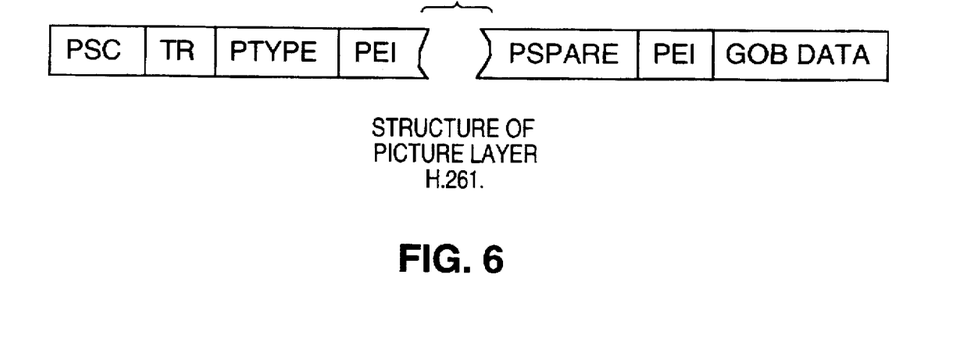
FIG. 6 is a diagram illustrating a structure for a picture layer compatible with the CCITT H.261 standard in accordance with the present invention.

Referring now to FIG. 6, the control information encoder 512 of FIG. 5 is explained in further detail. Data representative of the frame encoding time can be transmitted in the service channel under the CCITT H.221 standard, and more specifically in the application channel transmitted in the service channel by configuring the application channel to contain a 4800 bit/second or higher data channel. This configuration is performed by first signaling the bandwidth of the data channel to the demultiplexer 244 of FIG. 5 by utilizing the bit-rate allocation signal channel. The bit allocation signal code is sent every even-numbered fame. The encoding of the bit allocation signal is made in accordance with the attribute method. The first 3 bits (b0, b1 and b2) represent the attribute number and should be set to 011 (data command). The next 5 bits identify the specific command or capability, which in order to establish a 4800 bit/second channel, requires that bits b3 through b7 be set at 00011.

In addition to frame encoding time, data identifying which picture corresponds to a particular frame encoding time must be sent, in order to for the control information decoder 570 of FIG. 4 to properly instruct the delay circuit 566 as to the amount of delay to apply to the decompressed audio signal output from decompressor output 562. In a preferred embodiment of the invention, the frame identifying information is taken from the compressor 506 and provided to the control information encoder 512. Under the CCITT H.261 standard, data for each picture (the picture layer) consists of a picture header followed by data for a group of blocks ("GOB Data") as illustrated in FIG. 6. In the picture header is an information segment called temporal reference ("TR"). This temporal reference information is a 5-bit number which can have 32 possible values. It is formed by incrementing its value in the previously transmitted picture header by one plus the number of non-transmitted pictures (at 29.97 Hz) since the last transmitted picture. Such arithmetic is performed with only the five least significant bits. The TR data is transmitted together with the fame encoding time data in the established 4800 bit/second or higher data channel, thereby allowing the control information decoder to apply any given delay to the appropriate corresponding picture.

In the preferred embodiment of the invention, a look-up table correlates compression time data with an amount of delay to be applied to the decompressed audio data. The compression time data is expressed in terms of (video) frame encoding time, while the amount of delay incorporates not only the corresponding frame decoding time, but also a fixed value for the total time to encode and decode the corresponding audio signal. In determining the values to be utilized in the look-up table, the fixed value is taken into account (subtracted from) an amount of delay representative of the sum of the video frame encoding and decoding times.

In further detail, the compression time data will index into the look-up table with values representing a delay applicable to the audio playback starting time. Such delay is representative of the time it takes to decompress video minus the time it takes to compress and decompress the corresponding audio. The preferred embodiment of the invention therefore dynamically varies the amount of delay applied to audio based upon the compression time for the video.

Although the embodiments described herein are with reference to a single video signal and a single accompanying audio signal, the present invention is applicable to multiple video and audio signals originating from a single location, such as within a hospital's operating room, where multiple video camera are operating, but where the refresh rate of the different video signals is not the same for each video signal. In addition, the present invention is particularly useful for other applications, where synchronization of multiple data streams is desired. Those having ordinary skill in the art will certainly understand from the embodiments disclosed herein that many modifications are possible without departing from the teachings hereof. All such modifications are intended to be encompassed within the following claims.

I claim:

1. A system for dynamically synchronizing a plurality of streams of temporally related data, comprising:

a first compressor for compressing a first stream of data to generate a first compressed stream of data and for generating compression time data representative of a first period of time $t_1$ required to compress the first stream of data;

a second compressor for compressing, within a second period of time $t_2$, a second stream of data to generate a second compressed stream of data, the second stream of data temporally related to the first stream of data;

transmission means for transmitting the compressed first stream of data, the compressed second stream of data and the compression time data;

a first decompressor for decompressing, within a third period of time $t_3$, the compressed first stream of data to generate first decompressed signal;

a second decompressor for decompressing, within a fourth period of time $t_4$, the compressed second stream of data to generate a second decompressed signal; and a delay circuit for delaying the second decompressed signal by an amount of time substantially equal to $(t_1+t_3)-(t_2+t_4)$.

2. The system of claim 1, further comprising:

means for determining from the compression time data the amount of time for delaying the second decompressed signal.

3. The system of claim 2, wherein the means for determining comprises:

a look-up table.

4. The system of claim 1, wherein the transmission means further comprises:

a transmission medium having a bandwidth at least as wide as the sum of the bandwidths of each of the first compressed stream of data, the second compressed stream of data and the compression time data.

5. The system of claim 4, further comprising:

a multiplexer operative to generate a multiplexed signal by time division multiplexing the first compressed stream of data, the second compressed stream of data and the compression time data, the multiplexed signal being coupled to the transmission medium; and a demultiplexer coupled to the transmission medium, the demultiplexer operative to time division demultiplex the multiplexed signal to regenerate the first compressed stream of data, the second compressed stream of data and the compression time data.

6. The system of claim 1, further comprising:

a encoder for combining control information with the compression time data to generate combined data; and a decoder for separating the combined data into control information and compression time data.

7. The system of claim 2, wherein the means for determining comprises:

a look-up table containing a constant value representative of the sum of the second and fourth periods of time.

8. A system for dynamically synchronizing a plurality of streams of temporally related data, comprising:

a first compressor for compressing a first stream of data to generate a first compressed stream of data and for generating compression time data indicative of a period of time required to compress the first stream of data;

a second compressor for compressing, a second stream of data to generate a second compressed stream of data, the second stream of data temporally related to the first stream of data;

a multiplexer operative to generate a multiplexed signal by time division multiplexing the first compressed stream of data, the second compressed stream of data and the compression time data, the; and a transmission medium for transmitting the multiplexed signal, the multiplexed signal being coupled to the transmission medium;

a demultiplexer coupled to the transmission medium, the demultiplexer operative to time division demultiplex the multiplexed signal to regenerate the first compressed stream of data, the second compressed stream of data and the compression time data;

a first decompressor for decompressing, the regenerated compressed first stream of data to generate first decompressed signal;

a second decompressor for decompressing, the regenerated compressed second stream of data to generate a second decompressed signal;

means for determining from the compression time data a delay time for delaying the second decompressed signal; and a delay circuit coupled to the means for determining for delaying the second decompressed signal in accordance with the delay time.

9. A method of dynamically synchronizing a plurality of streams of temporally related data, comprising the steps of:

compressing a first stream of data to generate a first compressed stream of data and compression time data indicative of a first period of time, required to compress the first stream of data;

compressing, within a second period of time $t_2$, a second stream of data to generate a second compressed stream of data, the second stream of data temporally related to the first stream of data;

transmitting the compressed first stream of data, the compressed second stream of data and the compression time data;

decompressing, within a third period of time $t_3$, the compressed first stream of data to generate first a decompressed signal;

decompressing, within a fourth period of time $t_4$, the compressed second stream of data to generate a second decompressed signal; and delaying the second decompressed signal by an amount of time substantially equal to $(t_1+t_3)-(t_2+t_4)$.

10. The method of claim 9, further comprising the step of:

determining the amount of time of delay from the third period of time.

11. The method of claim 10, wherein the step of determining the third period of time, further comprises the step of:

correlating the compression time data with stored data representative of the relationship between each first period of time and a corresponding third period of time.

12. The method of claim 9, wherein the step of transmitting further comprises the step of:

transmitting with a bandwidth at least as wide as the sum of the bandwidths of each of the first compressed stream of data, the second compressed stream of data and the compression time data.

13. The method of claim 9, further comprising the steps of:

generating a multiplexed signal by time division multiplex the first compressed stream of data, the second compressed stream of data and the compression time data, the multiplexed signal being coupled to the transmission medium; and time division demultiplexing the multiplexed signal to regenerate the first compressed stream of data, the second compressed stream of data and the compression time data.

14. The method of claim 9, further comprising the steps of:

combining control information with the compression time data to generate combined data; and separating the combined data into control information and compression time data.

15. The method of claim 9, further comprising the step of:

selecting a predetermined fixed value as the sum of the second and fourth periods of time.

16. A method for dynamically synchronizing a plurality of streams of temporally related data, comprising the steps of:

compressing a first stream of data to generate a first compressed stream of data and generating compression time data indicative of a period of time required to compress the first stream of data;

a second compressor for compressing, a second stream of data to generate a second compressed stream of data, the second stream of data temporally related to the first stream of data;

generating a multiplexed signal by time division multiplexing the first compressed stream of data, the second compressed stream of data and the compression time data, the multiplexed signal being coupled to the transmission medium; and transmitting the multiplexed signal;

time division demultiplexing the multiplexed signal to regenerate the first compressed stream of data, the second compressed stream of and the compression time data;

decompressing the regenerated compressed first stream of data to generate first decompressed signal;

decompressing the regenerated compressed second stream of data to generate a second decompressed signal;

determining from the regenerated compression time data a delay time for delaying the second decompressed signal; and delaying the second decompressed signal by the delay time.

17. A system for dynamically synchronizing a plurality of streams of temporally related data, comprising:
a first compressor for compressing a first stream of data to generate a first compressed stream of data and for generating compression time data representative of a period of time required to compress the first stream of data;
a second compressor for compressing a second stream of data to generate a second compressed stream of data, the second stream of data temporally related to the first stream of data;
transmission means for transmitting the compressed first stream of data, the compressed second stream of data and the compression time data;
a first decompressor for decompressing the compressed first stream of data to generate first decompressed signal;
a second decompressor for decompressing the compressed second stream of data to generate a second decompressed signal; and
a delay circuit for delaying the second decompressed signal by an amount of time determined from the compression time data.

18. The system of claim 17, further comprising:
means for determining the amount of time for delaying the second decompressed signal.

19. The system of claim 18, wherein the means for determining comprises:
a look-up table.

20. The system of claim 17, wherein the transmission means further comprises:
a transmission medium having a bandwidth at least as wide as the sum of the bandwidths of each of the first compressed stream of data, the second compressed stream of data and the compression time data.

21. The system of claim 20, further comprising:
a multiplexer operative to generate a multiplexed signal by time division multiplexing the first compressed stream of data, the second compressed stream of data and the compression time data, the multiplexed signal being coupled to the transmission medium; and
a demultiplexer coupled to the transmission medium, the demultiplexer operative to time division demultiplex the multiplexed signal to regenerate the first compressed stream of data, the second compressed stream of data and the compression time data.

22. The system of claim 17, further comprising:
a encoder for combining control information with the compression time data to generate combined data; and
a decoder for separating the combined data into control information and compression time data.

23. A method of dynamically synchronizing a plurality of streams of temporally related data, comprising the steps of:
compressing a first stream of data to generate a first compressed stream of data and compression time data indicative of a period of time required to compress the first stream of data;
compressing a second stream of data to generate a second compressed stream of data, the second stream of data temporally related to the first stream of data;
transmitting the compressed first stream of data, the compressed second stream of data and the compression time data;
decompressing the compressed first stream of data to generate a first decompressed signal;
decompressing the compressed second stream of data to generate a second decompressed signal; and
delaying the second decompressed signal by an amount of time determined from the compression time data.

24. The method of claim 23, wherein the step of determining the amount of time for delaying the second decompressed signal, further comprises the step of:
correlating the compression time data with stored data representative of the relationship the period of time required to compress the first stream of data and a period of time required to decompress the compressed first stream of data.

25. The method of claim 23, wherein the step of transmitting further comprises the step of:
transmitting with a bandwidth at least as wide as the sum of the bandwidths of each of the first compressed stream of data, the second compressed stream of data and the compression time data.

26. The method of claim 23, further comprising the steps of:
generating a multiplexed signal by time division multiplex the first compressed stream of data, the second compressed stream of data and the compression time data, the multiplexed signal being coupled to the transmission medium; and
time division demultiplexing the multiplexed signal to regenerate the first compressed stream of data, the second compressed stream of data and the compression time data.

27. The method of claim 23, further comprising the steps of:
combining control information with the compression time data to generate combined data; and
separating the combined data into control information and compression time data.

28. The method of claim 24, further comprising the step of:
including within the stored data correlated with the compression time data a fixed value representative of the sum of the times for compressing the second stream of data and decompressing the compressed second stream of data.

29. A system for dynamically synchronizing a plurality of streams of temporally related audio and video data, comprising:
a first compressor for compressing streams of video data to generate compressed streams of video data, each stream of video data corresponding to a frame, for generating compression time data representative of a period of time required to compress each stream of video data, and for generating frame identification data for identifying a respective frame corresponding to each compressed stream of video data;
a second compressor for compressing streams of audio data to generate compressed streams of audio data, each stream of audio data temporally related to a respective stream of video data;
transmission means for transmitting each compressed stream of video data, each compressed stream of audio data, the compression time data and the frame identifying data;
a first decompressor for decompressing each compressed stream of video data to generate decompressed streams of video data;
a second decompressor for decompressing each compressed stream of audio data to generate decompressed streams of audio data; and a delay circuit for delaying, by an amount of time determined from the compression time data, each decompressed stream of audio data corresponding to a respective frame identified by the frame identification data.

30. The system of claim 29, further comprising:

means for determining the amount of time for delaying the second decompressed signal.

31. The system of claim 30, wherein the means for determining comprises:

a look-up table.

32. The system of claim 29, wherein the transmission means further comprises:

a transmission medium having a bandwidth at least as wide as the sum of the bandwidths of each of one of the compressed streams of video data, one of the compressed streams of audio data, the compression time data and the frame identification data.

33. The system of claim 32, further comprising:

a multiplexer operative to generate a multiplexed signal by time division multiplexing each compressed stream of video data, each compressed stream of audio data, the compression time data and the frame identification data, the multiplexed signal being coupled to the transmission medium; and a demultiplexer coupled to the transmission medium, the demultiplexer operative to time division demultiplex the multiplexed signal to regenerate each compressed stream of video data, each compressed stream of audio data, the compression time data, and the frame identification data.

34. The system of claim 29, further comprising:

a encoder for combining control information with the compression time data and the frame identification data to generate combined data; and a decoder for separating the combined data into control information, compression time data and frame identification data.

35. A method of for dynamically synchronizing a plurality of streams of temporally related audio and video data, comprising:

compressing streams of video data to generate compressed streams of video data, each stream of video data corresponding to a frame;

generating compression time data representative of a period of time required to compress each stream of video data;

generating frame identification data for identifying a respective frame corresponding to each compressed stream of video data;

compressing streams of audio data to generate compressed streams of audio data, each stream of audio data temporally related to a respective stream of video data;

transmitting each compressed stream of video data, each compressed stream of audio data, the compression time data and the frame identifying data;

decompressing each compressed stream of video data to generate decompressed streams of video data;

decompressing each compressed stream of audio data to generate decompressed streams of audio data; and delaying, by an amount of time determined from the compression time data, each decompressed stream of audio data corresponding to a respective frame identified by the frame identification data.

36. The method of claim 35, further comprising the step of:

determining from a look-up table the amount of time for delaying the second decompressed signal.

37. The method of claim 35, further comprising the steps of:

generating a multiplexed signal by time division multiplexing each compressed stream of video data, with a respective compressed stream of audio data, the compression time data and the frame identification data;, and demultiplexing the multiplexed signal to regenerate each compressed stream of video data, each respective compressed stream of audio data, the compression time data, and the frame identification data.

38. The method of claim 35, further comprising the steps of:

combining control information with the compression time data and the frame identification data to generate combined data; and separating the combined data into control information, compression time data and frame identification data.

* * * * *

UNITED STATES PATENT AND TRADEMARK OFFICE
CERTIFICATE OF CORRECTION

PATENT NO. : 5,751,694
DATED : May 12, 1998
INVENTOR(S) : Rolf Toft

It is certified that error appears in the above-identified patent and that said Letters Patent is hereby corrected as shown below:

At Col. 9, line 23, please delete "the" (second occurrence).

At Col. 9, line 50, after "time" please insert --$t_1$--. and delete ",".

At Col. 10, line 56, after "of" please insert --data--.

Signed and Sealed this

Fifteenth Day of September, 1998

Attest:

BRUCE LEHMAN

*Attesting Officer*        *Commissioner of Patents and Trademarks*